United States Patent
Bassin et al.

(10) Patent No.: US 7,073,587 B2
(45) Date of Patent: Jul. 11, 2006

(54) SYSTEM FOR INCREASING PRODUCTIVITY OF OIL, GAS AND HYDROGEOLOGICAL WELLS

(75) Inventors: Yakov Bassin, Belmont, MA (US); Valentin T. Grebennikov, Moscow (RU); Boris Goldstein, Hillsborough, CA (US); Anatoly N. Ivanov, St. Peterburg (RU); Lon M. Marmorshteyn, San Mato, CA (US)

(73) Assignee: 1407580 Ontario Inc, Toronto (CA)

( * ) Notice: Subject to any disclaimer, the term of this patent is extended or adjusted under 35 U.S.C. 154(b) by 91 days.

(21) Appl. No.: 10/719,293

(22) Filed: Nov. 22, 2003

(65) Prior Publication Data

US 2005/0022988 A1 Feb. 3, 2005

Related U.S. Application Data

(62) Division of application No. 09/976,908, filed on Oct. 13, 2001, now Pat. No. 6,651,741.

(51) Int. Cl.
*E21B 43/25* (2006.01)

(52) U.S. Cl. ........................................ 166/298; 166/55
(58) Field of Classification Search .................. 166/55, 166/212, 297, 223, 298, 269, 268, 272.6, 166/55.6
See application file for complete search history.

(56) References Cited

U.S. PATENT DOCUMENTS

| 4,462,718 | A | * | 7/1984 | McLaughlin et al. ....... 405/264 |
| 5,337,825 | A | * | 8/1994 | Marmorstein et al. ...... 166/307 |
| 5,445,220 | A | * | 8/1995 | Gurevich et al. ............. 166/55 |

* cited by examiner

*Primary Examiner*—Frank S. Tsay
(74) *Attorney, Agent, or Firm*—I. Zborovsky

(57) ABSTRACT

A system for increasing the productivity of oil, gas and hydrogeological wells has means for cutting slots only in a near well zone so as to perform a partial unloading of the well and to remove a part of support stresses, and means for cyclically treating well with a formation-treating substance so as to remove a remaining part of the support stresses, with controlling a density of a formation and correcting the cyclical treatment in correspondence with the density of the formation.

14 Claims, 3 Drawing Sheets

SYSTEM FOR INCREASING PRODUCTIVITY OF OIL, GAS AND HYDROGEOLOGICAL WELLS

CROSS-REFERENCE TO A RELATED APPLICATION

This application is a division of patent application Ser. No. 09/976,908 filed on Oct. 13, 2001 now U.S. Pat. No. 6,651,741.

BACKGROUND OF THE INVENTION

The present invention relates to oil and gas industry. It involves equipment for a new abrasive hydrojet perforation which offers an effective means to communicate the wellbore with the target formation and to achieve more effective completion due to an increase of flow area, bypassing the damage in a near-wellbore zone and reduction of the compressive stresses. The invention represents a new system for treatment of a near-well zone of producing formation with a combination of chemical treatment.

It is known that the flow from productive zones can be increased by slotting and chemical treatment. Slotting allows redistribution of the mechanical stresses in the near well zone, while chemical treatment allows increased productivity of the wells. However, the first method is very labor consuming and requires high costs. In order to shot three feet of the productive interval some time it is necessary to spend up to three hours of pumping unit operation, which is an expensive operation. The chemical action also treats the near well zone, but it requires a primary opening of the formation and does not remove a zone of support pressure which is a main reason of locking of the passages for fluid flow into the well. The first method is very efficient and increases the productivity of wells on average several times, however it is expensive. In order to provide maximum effectiveness or completely restore the potential productivity of wells, it is usually necessary to provide a subsequent treatment with formation-treating reagents.

The method and system disclosed in SU1167925 is a combined solution for the increase of productivity, which includes slotting of the well and cyclic acid formation treatment. The slotting is performed in accordance with known "classic" recommendations in order to obtain a maximum possible effect, while the cyclic acid treatment is performed also in accordance with the known method described in the above mentioned documents, for a depth which is not less than 5 diameters of the well, so as to attempt to completely use its possibilities without the consideration of the results of slotting or control of the results of each cycle. The cyclical "periodic" treatment of a well was performed by a reagent solution whose volume was determined from a mass and porosity of rock adjoining a shaft of the well, at a distance of approximately two diameters from the well. Each cycle of treatment is performed by pressing of a calculated volume of solution into the formation to be treated, which is preliminary limited from above and from below by packers. The treatment in some sense is performed blindly, the results were evaluated in accordance with a change of productivity of the well. The cycles of treatment continued until the time when repetition did not lead to a change in productivity.

It has been shown from practice that this method and system which include a complete slotting with a subsequent complete treatment with technological reagents has a universal action of the formation and provides an increase of well productivity, an equalization of a profile of advancement of a front of water pumped into a formation for maintaining of the formation pressure, a increase of the oil yield of the formation. Because of these advantages this method has been widely utilized. It also has been used during exploration and drilling of new wells. Moreover, it was made possible with this method to explore and efficiently use wells in low-production formations of Western Siberia in which the oil flow is less than 30 bbl per day. This method therefore is efficient. However, this method, similarly to the other methods has a limitation as to its possibility and efficiency. It is expensive, labor consuming and does not guarantee obtaining of the maximum possible increase of well productivity. The method is used without consideration of negative action of elevated stress concentrations, which are formed near the wellbore.

It is known that the maximum stresses in the near well zone are generated within one diameter of the well or approximately 0.6 ft., and the maximum stress directly adjoins the walls of the well (FIG. 1). The plastic zone in this case can be not considered, since in accordance with the calculation its width at the depth of 10,000 ft. is only 0.03 ft.. It is also known that during the process of drilling of wells, even after carrying out of slot slotting, a zone of support pressure remains near it. The slot removes only a part of these stresses, which is equivalent to a reduction of depth of the well approximately 1.5 times. During slotting at the depth of 10,000 ft. it is equivalent to a reduction of stresses to the depth of 6,600 ft.. However, the mode and parameters of acid treatment (or treatment with other reagents, such as technological compositions) nowadays are determined without consideration of negative influence of the remaining stresses near the well. The zone of support pressure, which remains around the well, is not taken into consideration and parameters of treatment with technological compositions are calculated from the condition of action of a uniform supply of active technological solution per volume unit of a formation.

However, experimental observations and analytical investigations showed that the influence of zone of support pressure near the well is significant. If this influence is not taken into consideration, false conclusions can be made with respect to the productivity of the wells. Based on the results of the treatment, it is considered that a low oil yield from a formation can be explained by a week natural permeability of the formation itself, while a real cause is the reduction of permeability only within limits of the zone of support stresses, caused by stress concentration beyond the wellbore.

SUMMARY OF THE INVENTION

Accordingly, it is an object of the present invention to provide a system which allows to reduce labor consumption and cost of treatment of a well, without a reduction of efficiency of treatment, time of use of wells, and gas/oil yield of productive formations.

In keeping with these objects and with others which will become apparent hereinafter, one feature of present invention resides, briefly stated, in a system for increasing the productivity of oil, gas and hydrogeological wells, comprising means for cutting slots only in a near well zone so as to perform a partial unloading of the well and to remove a part of support stresses; and means cyclically treating well with a formation-treating substance so as to remove a remaining part of the support stresses, with controlling a density of a formation by controlling means and correcting the cyclical treatment in correspondence with the density of the formation.

When the system is designed in accordance with the invention it provides the following benefits:

The slotting with the inventive system provides a very precise, reliable and controllable method to establish a large inflow path between the cased borehole and the formation. The inflow area of an 8-in per foot dual slot is equivalent to 36 spf of 0.75-in shaped charge holes. Moreover, the pressure drop on the slot is significantly less then on the areal equivalent set of perforated holes. In addition, the cutting process is much more robust in creating a low-resistant flow path, even with two strings of casing.

The slotting preserves the integrity of the cement bond. This can be critical for zonal isolation when the perforated intervals are in close proximity to water or a gas cap. The integrity of the cement sheath also increases the casing strength and resistance to failure.

The created slots simplify the fracture initiation and therefore may significantly reduce the near wellbore problems (multiple fracturing, tortuosity, etc). This reduces the chances of screenouts during fracture stimulation and minimizes the choking non-darcy effect because of the tortuous path during production (esp., in gas wells).

The slot geometry (with the penetration depth up to 4–10 ft) bypasses the near wellbore mud invasion zone and increases the drainage area. This suggests that the inventive slotting in clean, high permeability sands is the preferred completion method. If these clean formations require sand control, slotting can be used in combination with high rate water packs. For laminated formations, slots in should result in the consistent negative skin completions.

The cutting does not reduce the near wellbore strength of the formation, as does conventional shape charge perforating. Under some circumstances, this feature in combination with a larger created drainage area may allow a natural completion of formations that currently require sand control.

The slots modify the stresses in near the wellbore zone (relaxed in zone adjacent to the slots, and increased at the tip zone). Formations with strong stress-dependant permeability may encounters significantly reduced completion skin moreover, for deep and relatively hard formations. Slotting may achieve compressive fracturing in the near wellbore region that results in a significant permeability increase at a distance of several slot diameters and dramatic reduction of the near well bore conversion pressure drop. In gas wells it will reduce (or completely eliminate) sometimes very large non-darcy skin.

In order to optimize the method, the system operates so that the partial abrasive hydroet perforation is performed by cutting slots only in surrounding column, cement layer and a part of the productive zone of the formation.

This method allows cutting slots in a thin productive zone and in the case when the productive layer is not far away from the water horizons. Abrasive hydrojet perforation is performed by fluids, which includes water and quartz sand. This allows preserving the integrity of the cement and leads toward higher penetration into the formation compared to other systems and methods (conventional perforation, hydrofracturing).

The system can be divided into surface and underground equipment. Underground equipment includes an engine with nozzles, which is connected to surface pumping units. For abrasive hydrojet perforation, hydrojet perforators are used; for single slotting the perforator is used with 4 nozzles. Nozzles are located 180 degrees across from each other. The distance between nozzles is around 4". The abrasive fluid is recycled all the time during the process in addition underground equipment includes: underground engine switch and hydrojet perforator. This equipment can slot in one session three intervals with the approximate length of 3 ft each. After that perforators must be changed description of the slotting technique is shown on.

Surface equipment includes pumping units, mixer blender of sand/water, block manifold, filters and connectors. Pumping units for abrasive hydrojet perforation can be used with the following characteristic 5,000–10,000 psi, depending on well depth and continuous working capacity of 6 hours.

Figure 1:
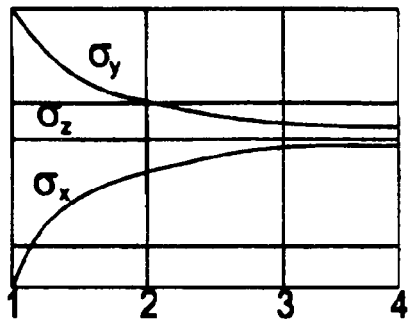
FIG. 1 illustrates σ in abrasive hydrojet slotting perforation

In the drawings the following symbols are utilized:

$\sigma_x, \sigma_y$ are a vertical and a horizontal stress, $\sigma_{y1}$ is a remaining maximum stress in a zone of support stresses before a beginning of a formation treatment (after a partial slot abrasive hydrojet perforation), $\sigma_{y2}$ is a remaining maximum stress in a zone of support of stresses after a first cycle of formation treatment, yH is a remaining maximum stress in a zone of support stresses after the end of formation treatment, $r_1$ is a radius zone of remaining support stresses before the beginning of formation treatment (after a partial abrasive hydrojet perforation), $r_2$ is a radius of a zone of remaining support stresses after a first cycle of formation treatment, $r_3$ is a radius of zone of reduced support stresses around the well after a first cycle of formation treatment.

DESCRIPTION OF THE PREFERRED EMBODIMENTS

It is known that a maximum stress in a near wellbore zone within one diameter of a well shown in FIG. 1 is approximately 0.6 ft. The maximum stresses directly adjoin the walls of the well. In the present invention it is permissible not to consider a plastic zone, since in accordance with calculations its width on the depth of 10,000 ft is only 0.4".

It is therefore proposed to provide a new system which allows to reduce and redistribute the maximum stresses without a complete cutting of an unloading slot. This significantly accelerates and reduces the cost of the method. Then it is suggested to remove by the inventive system the remaining part of stresses in the zone of support pressure with another method (formation treatment) with labor consumption which is lower than usual. As a result, a desired corridor for movement of useful fluids into the well is formed in a reliable and less labor consuming method.

The corresponding operations performed by the inventive system include the following sequence.

Before the beginning of works, porosity and density of a formation is evaluated by a geophysical methods. For example the porosity is determined by a neutron logging, while density is determined in accordance with a density logging. If the porosity is higher than approximately 15%, the speed of movement of a perforator is selected to be 1.5 hours for 3 ft, instead of the conventional three hours for 3 ft. In this case, a surrounding pipe, cement and a main part of the area of increased stresses will be cut through, and directions for pumping of a formation treatment solution are created. The solution, in addition to a conventional dissolution of cementing substance of the productive formation, performs pressurization of rock of the productive formations and therefore increases support stresses.

If porosity of rock is less than 15%, the abrasive hydrojet perforation is performed in accordance with the traditional method, with a speed of cutting of the slot about three hours for 3 ft. After this, because of the formation of a great draining surface a more reliable depressurization of rock in the zone of support pressure is performed, and a maximum reduction of stresses in the near well zone is obtained.

The formation treating agent can be for example a solution of hydrochloric acid (for carbonate rock and for terrigen rock with a significant content of carbonate cement).

Figure 5:
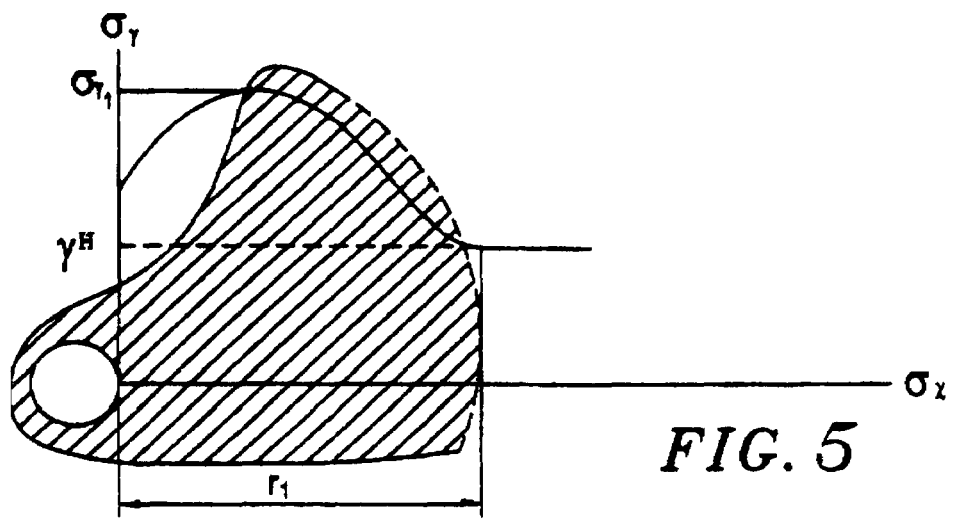
FIGS. 5, 6, 7 are views showing a distribution of stresses in a near well zone before the beginning of a cyclical treatment, after a first cycle of treatment, and after the end of treatment correspondingly.

Initially, the remaining stress-deformed condition of rock in the near well zone is evaluated, and bases on it, a pattern of distribution of support stresses is determined as represented by a curve 1 in FIG. 5.

The stress condition is evaluated by experimental methods. In wells which do not have surrounding tubes, it is necessary to use electrometric and ultrasound methods. In wells which are provided with surrounding tubes, it is possible to use a system for ratioactive (density and neutron) logging. It is also possible to use analytical methods for the calculation of parameters of the zone of support pressure.

Based on the evaluation of stress condition, a zone of support loads and a compaction of rocks with radius $r_1$ (FIG. 5) is determined and a volume of rocks is calculated, within limits of a cylindrical column near a well, which are to be subjected to a preliminary treatment $$Vr1 = \pi(r_1^2 - rc_2^2)m,$$

wherein m is a thickness of a formation-collector, rc is a radius of the well.

In correspondence with this volume, a volume of an acid solution for pumping (pressing through) into a near well zone of formation is determined:

$$V_{p1} = V_{r1} \cdot n,$$

wherein n is a porosity of rock of a formation-collector.

Figure 6:
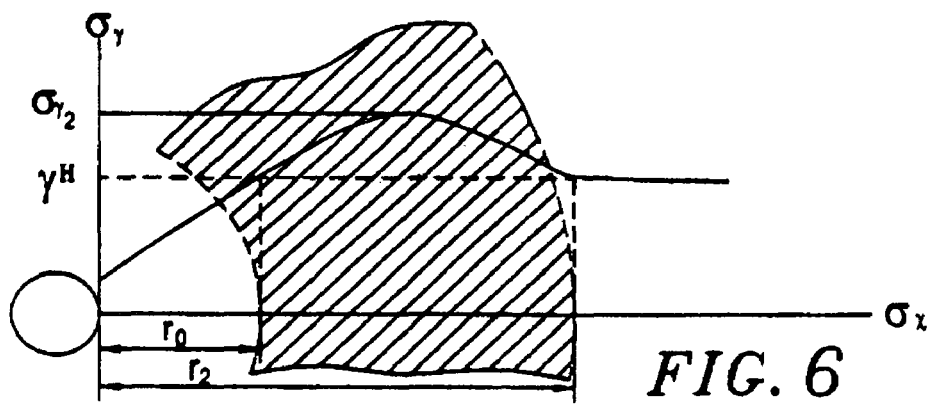

This portion of solution is pumped into the well, pressed into a near well zone of formation for action on the zone of support pressure. As a result of this action, dissolving of both a cement of rock and the rock itself is performed. When the dissolved mass is withdrawn, density of rock and action in this zone of stresses is reduced. The evaluation of the obtained effect of depressurization is performed by the geophysical methods. The efficiency of treatment with a first cycle can be insufficient. FIG. 6 shows that as a result of the first cycle of action, a certain effect is obtained, which is a reduction of maximum value of stresses to the value $\sigma y_1 < \sigma y_2$. Near the wall of well, a ring of reduced stresses with a radius $r_0$ is obtained. However, within the interval $r_2$ stresses continue to act, which exceed initial stresses of untouched mass.

In this case a second cycle of pumping is performed in accordance with the same or reduced parameters. A change of quantity of the pumped solution to increase the volume $Vp_1$ is necessary in the case if an exterior radius of a ring of compaction is increased $r_2 > r_1$.

After the second cycle of action, again a control of efficiency is performed and the necessity of a subsequent treatment of the zone is determined.

Figure 7:
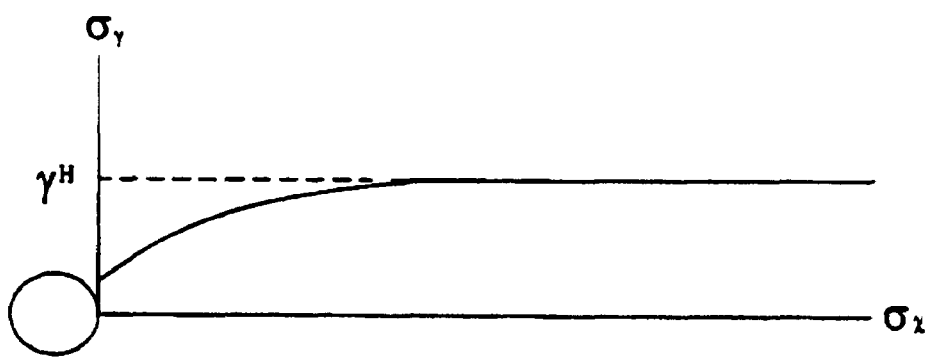

An ideal result of the treatment is a complete removal of a "splash" of support loads when in the vicinity of a well a "funnel" of stress is formed, which is characterized by a pattern of monotonous increase of stresses and density of rocks from a wall of the well into a depth of the mass as shown in (FIG. 7).

The achievement of this pattern is not always necessary. Even a partial depressurization of rock in the zone of support pressure can provide a sufficient effect of increase in well productivity. Therefore, a factor of efficiency of treatment K is introduced, which characterizes a given critical level, in accordance with which it is necessary to reduce stresses acting in a support zone.

$$K = \frac{\sigma_{y1} - \sigma_{y2}}{\sigma_{y1} - \gamma H}$$

Figure 3:
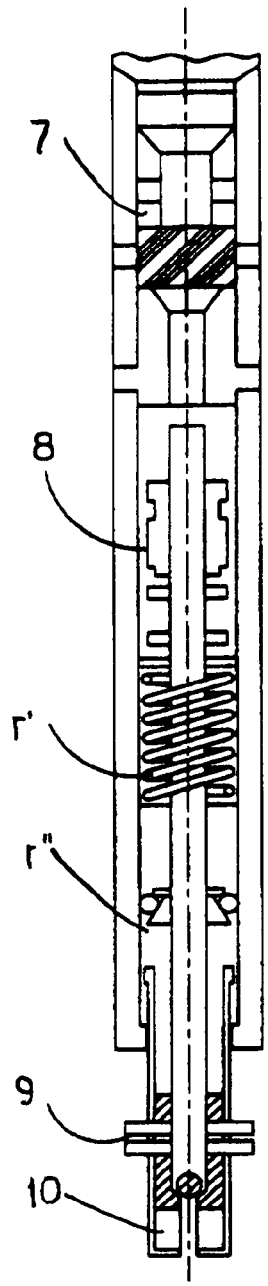
FIG. 3 shows an underground equipment in accordance with the present invention used for abrasive hydrojet slotting perforation.

The value K>1 corresponds to a complete unloading of rocks in the zone of support pressure as shown in FIG. 7. Values 0<K<1 correspond to a partial unloading of rocks as shown in FIG. 3. In practice the coefficient K is determined experimentally, but as a rule it can not be equal to 1.

Removal of a "threshold of compaction" in the zone of support pressure in certain conditions increases the productivity of well, not more than by 15%, which is summed with the effect of abrasive hydrojet perforation.

As for the selection of concrete composition of technological solutions for this treatment, it should be mentioned that for treatment of a terrigen collector of productive formation, there are utilized solutions of $NaHSO_4 \times H_2O$ and/or $K_2S_2O_7$ and/or $(NH)_4S_7O_8$ with concentration 4–7% with additions of anion active surface active substance or a mixture of anion active and non ionogenic surface active substance with concentrations 0.5–2%. The destruction of clay colmatating regions with this technological solutions is performed by disturbance of coagulating contacts between clay aggregates of colmatating regions, dissolution of admixtures, cementing sand, and dealkylization of alumosilicates which form carcases of clay aggregates.

When in a terrigen collector there is a carbonate fraction of higher than 30% and when there is a carbonate collector of the productive formation, then a technological solution with an acid reaction can be a solution of $NH_2SO_3H$ with admixtures of anion active surface active substance and a mixture of anion active and non iongenic surface active substance with concentration 0.2–0.4% and polyphosphates with concentration 0.1–0.2% or a solution of $CH_3COCl$ with concentrations 6–12% with admixtures of anion active surface active substance or a mixture of anion active and non ionogenic surface active substance with concentration 0.5–1% and polyphosphates with concentration 0.1–0.2%, and as polyphosphates $Na_5P_3O_{10}$ and/or $Na_2[Na_4(PO_3)_6]$ are utilized.

Sulphamine acid actively dissolves carbonate rocks. When a acethyle chloride is dissolved in water, a mixture of asetic and hydrochloric acid is formed in condition of active temperature increase:

$$CH_2COCl+H_2O=CH_3COOH+HCl+AQ\uparrow,$$

which also provides a dissolution of carbonates in a thusly formed rock area.

The utilization of agents of complex-forming action in the composition of a carrier liquid in the case of $Na_5P_3O_{10}$ and/or $Na_2[Na_4(PO_3)_6]$ stabilizes the technological solutions and prevents a secondary deposition of calcium in the case of very low concentrations which are not sufficient for binding of deposited cations into soluble complexes. The stabilization effect of such very small admixtures is connected with adsorption processes. Phosphate and ions are adsorbed on seeds or growing crystals, block active centers and therefore prevent precipitation of salts. As a result of laboratory tests for dissolving of carbonate rocks with such technological solutions with an acid reaction, optimal values of polyphosphates in condition of neutralization of solutions are determined as 01–02%.

The above mentioned technological solutions are preferably prepared directly in the treated formation. For example, powder chemical agents for preparation of solution are filled in a transporting package, the package is delivered into an interval of treated formation, and then the transporting package is removed, for example by its dissolution with a dissolving liquid supplied into the well. The powder mixture is made from components, introduced into containers (capsules or mini containers) with soluble enclosure, and transported to the interval of intersection of productive formation, preliminary separating it from lower and upper layers with a packer. Then, a dissolution of container is performed, or a solvent for capsule casing and a solvent for agents are introduced into the productive layer. When the solution is ready, the inter-pipe space is cut off by packers, and the solution is pressed into the formation. This leads to an economy of reagents, their more accurate dosage, simplification of requirements for a material of column and a pumping mechanism, elimination of corrosion, etc. This increases the efficiency of treatment by more accurate composition of the treating fluid in the productive treated formation, reduces the consumption of agents, and protects equipment of action of chemical agents in the fluid. This approach significantly reduces the volume of required agents, increases the quality of treatment by more accurate correspondence of real working formation-treatment composition to a calculated composition, reduces requirement to equipment and increases its service life.

The transporting package can be formed as a mini container, such as capsules with a soluble enclosure, in particular with the use of starch, in form of balls. The calculated quantity of balls is thrown into the well and then water is poured on them. Starch is dissolved in water without residual and without any harm.

The operation of the system in accordance with the present invention is illustrated by the following examples:

EXAMPLE 1

Initial conditions. A treatment of an operating well with a diameter 8" is performed, with a carbonate collector of 164 ft. at the depth 6,562 ft. It is known that an elasticity module is $E=3\times10^5$ MPa, specific weight of rock y=125 $lb/ft^3$. The well has an open shaft, and before treatment it is used with a yield 28.3 bbl/day.

Performed operations. It has been determined by geophysical methods that porosity of productive formation is 10%, density of the formation in a zone of support pressure p=193.5 $lb/ft^3$. Taking this into consideration, speed of cutting 0.45 hour per 1 ft. r and hour concentration of abrasive fluid 0.06 $lb/ft^3$. The composition of abrasive is a sand with grain 0,008–0,04" and quartz content not less than 50%.

The ground equipment is installed which provides a pressure of the abrasive fluid 4,800 psi, a predetermined concentration of abrasive fluid, washing of well, collection of stone material, and receipt of productive fluid. Then a underground equipment is connected, in particular a perforator engine with a perforator adjusted to the predetermined cutting speed 0.43"/minute. Then the underground equipment is lowered to the depth 6,562 ft. and after adjustment of the equipment of the depth, a slot cutting with the speed 4"/minute is performed. The cutting is performed approximately in (0.45×164=73.8) hours.

The abrasive hydrojet parforation is performed only in approximately 75 hours instead of 150 hours in a known method. After the partial slot treatment, the productivity of the well increased over 60 bbl/day.

The required reduction of density of the rock in the zone of support pressure was calculated $$\Delta p = \frac{1 \times 2000(80 \times 10^6 - 2 \times 10^4 2 \times 10^3}{3 \times 10^{11}} = 1.75$$

The volume of rock to be treated is determined Depth of slotting not less then four diameters equivalent to 32", open slotting 4", then we can calculate the volume of the slot:

$$V+32 \times 4 \times 164=132 \ bbl.$$

Where productive layer in the formation equal 164 ft. as well as required volume of acid:

$$132 \times 0.1 - 3.2 = 10 \ bbl.$$

3.2-volume without slotting 0.1-porosity of the collector.

Then 10 bbl. of acid is pumped into an interval of treatment, it is pressed into the formation, and after the reaction the products of reaction are removed by draining. Then the geophysical observations were performed, and it was determined that the stresses in the zone of support pressure reduced to 60 MPa, while a radius of the zone of support pressure increase to 1.6 ft. The obtained reduction of permeability is determined as follows:

$$\Delta p = \frac{\rho(\sigma_{yl}-\sigma_2)}{E}, \Delta p = \frac{6562(80-60)\cdot 10^6}{3 \cdot 10^{11}} = 0.84$$

The quantity of acid for the second cycle of treatment is calculated as follows.

$$\Delta p = 0.84 \ lb/ft.^3 < 1.75 \ lb/ft.^3$$

After this, another treatment of the productive interval was performed. The geophysical investigations were carried out, and an obtained reduction of density of rock in the zone of support pressure was determined. A complete removal of stresses in the zone of support pressure made possible to increase the productivity of well even more than by 20%.

The cost of the second stage, which is the formation treatment, and the common time of two cycles was only about 6 hours with an insignificant cost and a relatively simple equipment.

Therefore, the total time of operation in the given concrete case was correspondingly 80 hour, which is approximately ½ when compared with the traditional methods of increasing the productivity of wells. The efficiency of treatment and the time of maintaining the obtained yield are at least identical.

The main advantage of the proposed system is a significant reduction of labor consumption and the cost of the method, with maintaining of increased efficiency. This is achieved mainly by a system which performs two controlled and regulated stages, and provides optimal distribution of labor consumption and cost of the treatment between the two stages. Simultaneously, the system implements additional technological features which increase its efficiency, namely a new selection of agents and preparation of a technological solution directly in the well.

The operation of the system takes into consideration that the zone of support pressure adjoining the well is the most responsible in the system of filtration of fluid from the formation into the well. The quantity of flowing fluid (gas) per unit of filtering area is increased in second power when it approaches to the well. The highest intensity of streams is in this zone. This is the reason for the maximum "dirtying" of rocks with asphalt-resin and other deposits which substantially reduce the productivity of the well.

It is therefore extremely important to reduce the tendency to accumulation of destroyed particles of rocks and drilling solution, to eliminate the zone of dirtying and near well zone which is subjected to the action of support pressure and is the most close to the bare zone which is the zone of support pressure.

The proposed invention significantly reduces labor consumption and costs of works for increasing productivity and unobjectionable movement of fluids in this zone, which explains cleaning of filtering passages and therefore long-term action of the obtained effect of treatment.

Figure 2:
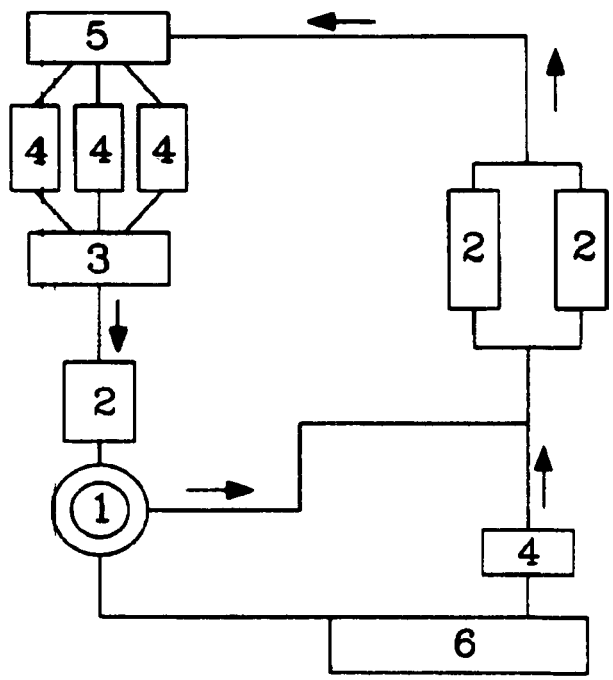
FIG. 2 shows a surface equipment of a system in accordance with the present invention used for abrasive hydrojet slotting perforation

FIG. 2 shows the surface equipment of the inventive system. Reference numeral 1 identifies a mouth of the well with a fountain equipment, reference numeral 2 identifies filters for cleaning of a pulp, reference numeral 3 identifies a block of manifolds, 4 is a pump aggregate, 5 is a sand mixing aggregate, and 6 is a containment.

FIG. 3 shows the underground equipment of the inventive system. It includes a coupling clutch 7, an underground engine 8 connected with pumping units and having nozzles, a hydrojet perforator 9, a valve control system 10; with recess and antirecess identified as as r' and r".

Figure 4:
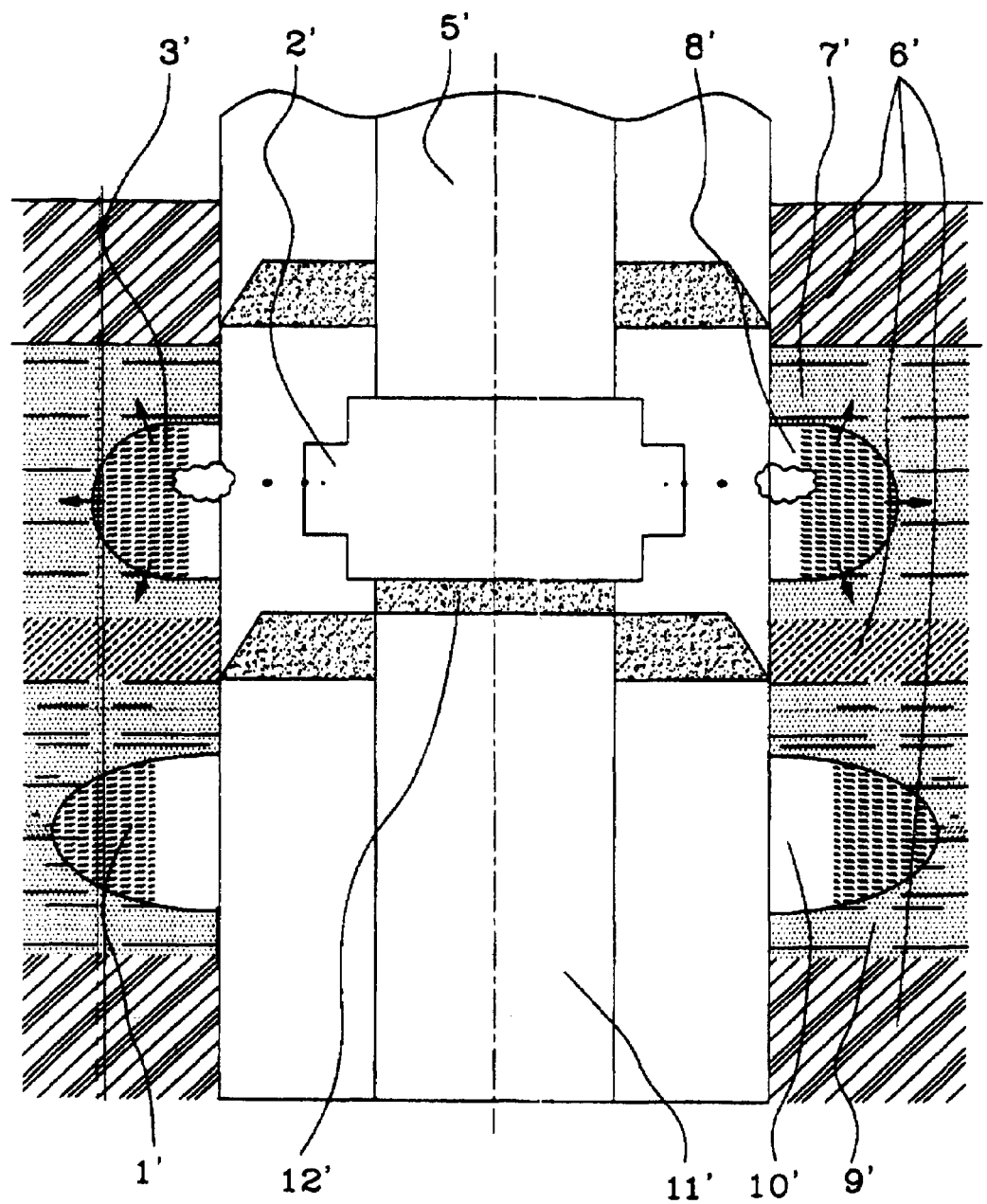
FIG. 4 shows operation of an inventive system for increasing productivity of wells.

In FIG. 4 reference numeral 11, identifies a chemically treated part of a productive layer with worsened collector properties, while reference numeral 13 identifies a treated part of the productive layer with good collector properties. The other elements shown in FIG. 1 are: a perforator 12, packers 14, pumping compressor pipes with an engine of the perforator 15, non permeable rock 16, a productive layer with good collector properties 17, a cut through part of the productive layer with good collector properties 18, a productive layer with worsened collector properties 19, a cut through part of the productive layer with worsened collector properties 20, a tall part 21 and a plug 22.

It will be understood that each of the elements described above, or two or more together, may also find a useful application in other types of constructions differing from the types described above.

While the invention has been illustrated and described as embodied in system for increasing productivity of oil, gas and hydrogeological wells, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

The invention claimed is:

1. A system for increasing the productivity of oil, gas and hydrogeological wells, comprising means for cutting slots only in a near well zone so as to perform a partial unloading of the well and to remove a part of support stresses; and means for cyclically treating well with a formation-treating substance so as to remove a remaining part of the support stresses, with controlling a density of a formation and correcting the cyclical treatment in correspondence with the density of the formation, wherein said slot cutting means is operative for slot cutting which includes cutting of slots only in a surrounding column, a cement layer, and a part of rock which immediately adjoins the well.

2. A system as defined in claim 1, wherein said means include a surface equipment and an underground equipment.

3. A system as defined in claim 1, wherein said slot cutting means is operative for slot cutting which includes preliminary determining a porosity of rock of the formation of the near well zone and a depth of a zone of support stresses, while the cyclical treatment is performed in dependence on the determined porosity and the depth.

4. A system as defined in claim 1; and further comprising means for introducing the formation-treating substance in form of jets.

5. A system as defined in claim 4, wherein said substance introducing means introduce the formation-treating substance which includes a solution of $NH_2SO_4H$ with admixtures of anion active surface active substance or a mixture of anion active and non ionogenic surface active substance with concentration 0.2–0.4% and polyphospate with concentration 0.1–0.2% or solution of $CH_3COCI$ with concentration 6–2% with admixtures of anion active surface active substance or a mixture of anion active and non ionogenic surface active substance with concentration of 0.5–1% and a polyphosphates with concentration 0.1–0.2%, and the polyphosphates include $Na_5P_3O_{10}$ and/or $Na_2[Na_n(PO_3)6]$.

6. A system for increasing the productivity of oil, gas and hydrogeological wells, comprising means for cutting slots only in a near well zone so as to perform a partial unloading of the well and to remove a part of support stresses; and means for cyclically treating well with a formation-treating substance so as to remove a remaining part of the support stresses, with controlling a density of a formation and correcting the cyclical treatment in correspondence with the density of the formation; and means for preparing the formation-treating substance directly in a well, and in an interval of a formation.

7. A system as defined in claim 6, wherein said means for preparing the formation treating substance including means using chemical agents in a transporting package, delivering the transporting package with the agents into the formation, and removing the transporting package.

8. A system as defined in claim 7, wherein said transporting package is a microcontainer formed as a capsule with soluble wall.

9. A system as defined in claim 8, wherein said soluble wall is composed of a soluble polyesthylene film.

10. A system as defined in claim 8, wherein said microcontainer is composed of a binder, which is soluble in water without residues.

11. A system as defined in claim 8, wherein said microcontainer has a shape selected of the group consisting of a ball shape and a cylinder shape.

12. A system for increasing the productivity of oil, gas and hydrogeological wells, comprising means for cutting slots only in a near well zone so as to perform a partial unloading of the well and to remove a part of support stresses; and means for cyclically treating well with a formation-treating substance so as to remove a remaining part of the support stresses, with controlling a density of a formation and correcting the cyclical treatment in correspondence with the density of the formation, wherein said means include a surface equipment and an underground equipment, wherein said surface equipment includes a fountain equipment, filters for cleaning a pulp, a block of manifolds, a pulp, a block of manifolds, a pump aggregate, a sand mixing equipment, and a contaminant, said underground equipment including a coupling clutch, an underground engine, a hydrojet perforator and a valve control system.

13. A system for increasing the productivity of oil, gas and hydrogeological wells, comprising means for cutting slots only in a near well zone so as to perform a partial unloading of the well and to remove a part of support stresses; and means for cyclically treating well with a formation-treating substance so as to remove a remaining part of the support stresses, with controlling a density of a formation and correcting the cyclical treatment in correspondence with the density of the formation, wherein said cyclical treatment means includes means which, before each cycle, determine a radius of a zone of support pressure and a maximum stress acting in it, and perform the cyclical treatment for all parts of a formation adjoining the well including the zone of support pressure, and after each cycle of the cyclical treatment control a change of density or permeability of rock in the zone of support pressure.

14. A system for increasing the productivity of oil, gas and hydrogeological wells, comprising means for cuttings slots only in a near well zone so as to perform a partial unloading of the well and to remove a part of support stresses; and means for cyclically treating well with a formation-treating substance so as to remove a remaining part of the support stresses, with controlling a density of a formation and correcting the cyclical treatment in correspondence with the density of the formation, means for introducing the formation-treating substance in form of jets, wherein said introducing means introduce the formation-treating substance which includes solutions of $NaHSO_4 \times H_2O$ and/or $(NH_4)S_7O_8$ with concentration 4–7% and with admixtures of anion active surface active substance or a mixture of anion active and non ionogenic surface active substance with concentration 0.5–2%.

* * * * *